United States Patent [19]

Feinberg

[11] 4,383,682

[45] May 17, 1983

[54] VISE JAW ASSEMBLY HAVING AN INCLINEABLE PLATFORM FOR SUPPORTING A WORKPIECE AT A SELECTED ANGLE

[76] Inventor: Howard Feinberg, 910 N. Almansor St., Alhambra, Calif. 91801

[21] Appl. No.: 233,733

[22] Filed: Feb. 12, 1981

[51] Int. Cl.[3] .............................................. B23Q 1/04

[52] U.S. Cl. ....................................... 269/76; 269/258; 269/261; 269/283; 409/224

[58] Field of Search ..................... 269/63, 69, 76, 258, 269/261-262, 265, 296-302, 303-304, 283; 409/903, 168, 224

[56] References Cited

U.S. PATENT DOCUMENTS 2,284,449 5/1942 Rodess ................................ 269/261

2,881,667 4/1959 Ebert ..................................... 269/69

*Primary Examiner*—Robert C. Watson

*Attorney, Agent, or Firm*—Fischer, Tachner & Strauss

[57] ABSTRACT

A vise jaw assembly interchangeable with conventional jaws for precision vises commonly used for holding a workpiece in relation to a cutting tool such as the milling tool of a milling machine. The assembly includes a rotateable or inclineable platform for supporting the workpiece at a selected angle precisely controlled by an indexed rotator protruding through a window on the top surface of the jaw and connected to the platform by means of a shaft extending beyond the face of the jaw toward the opposing jaw.

6 Claims, 8 Drawing Figures

VISE JAW ASSEMBLY HAVING AN INCLINEABLE PLATFORM FOR SUPPORTING A WORKPIECE AT A SELECTED ANGLE

BACKGROUND OF THE INVENTION

1. Field of the Invention

The present invention pertains generally to vises and more specifically, to the jaw of a precision vise such as those used in conjunction with milling machines and the like to accurately locate and retain a workpiece in relation to the cutting tool of such machines.

2. Prior Art

Vises are well-known in the machining tool art and among machinists who use such tools. Precision vises are used in conjunction with machining equipment such as milling machines for the purpose of accurately controlling and retaining a workpiece in a required position relative to the cutting tool of a milling machine and the like in order to make precise changes in the structure of the workpiece. Furthermore, it is well-known that a workpiece must often be oriented at a particular angle with respect to one of its edges within the vise so that a milling cut can be accomplished at a selected angle. For example, it is not uncommon for a machinist to use a milling machine to make a milling cut in a first direction for a given depth within the workpiece and then to have to reorient the piece to change the direction of the next cut to a pre-selected angle relative to the direction of the first cut. It is the reorientation of the workpiece and the accurate, stable positioning thereof that the present invention is designed to facilitate.

Until applicant's present teachings, it has been typical for a machinist operating a milling machine who must reorient the workpiece for the aforementioned changes, to first release the pressure of the vise jaws being applied to the workpiece for retaining it at a particular location and angle with respect to the cutting tool and then to utilize a protractor or other angle measurement device for reorienting the workpiece at the desired new angle, and then to tighten the vise jaws to reapply sufficient pressure on the work piece to retain it in the newly selected angular position. It will be understood by those having skill in the art to which the present invention pertains that such a process suffers from a number of disadvantages. By way of example, additional time is consumed in having a milling machine operator search for and retrieve the appropriate angle measurement instrument and the difficulty of reading that instrument increases the likelihood of inaccuracy in the newly positioned angle for the workpiece. Further inaccuracies commonly occur as a result of the inherent difficulty in properly maintaining the workpiece at the newly selected angle within tolerance limits while retightening the vise jaws. The vise jaws support the workpiece in only a lateral direction providing no underlying platform that can assure stability of the reselected angle of the workpiece while the vise jaws are tightened. As a result, the prior art procedure commonly employed to reorient a workpiece at a newly selected angle with respect to the cutting tools of a milling machine and the like is inherently costly, requires great care on the part of the machinist and is potentially more likely to reslt in an inaccurate cut because of the difficulty in precisely repositioning the workpiece at the newly selected angle with respect to the cutting tool.

SUMMARY OF THE INVENTION

The present invention overcomes the aforementioned disadvantages of the prior art by providing a unique vise jaw that includes an inclineable platform extending therefrom in proximity to the jaw face. The platform is mounted on a rotatable shaft or rotor. The rotor is in fixed engagement with an angle indicator mounted into the vise jaw. The indicator is indexed in 2° increments to provide an accurate representation of the rotational position of the shaft relative to a reference starting point. By way of example, the starting point may be the horizontal position of the platform which is affixed to the shaft so that the platform may be inclined from the horizontal and towards the vertical in either direction by a selected number of degrees. The angle indicator is the outer circumferential surface of a rotator having the the form of a segment of a thin circular cylinder.

In a preferred embodiment of the invention disclosed herein, the platform may be rotated or inclined 90° in either direction from the horizontal. Such angular repositioning is accomplished by means of the angle indicator thus precluding the aforementioned prior art requirement for use of a protractor or other angle indicating device that is separate and apart from the vise. Furthermore, the platform of the present invention provides stable support structure for the workpiece between the jaws of the vise so that even after the angular position of the workpiece has been selected, maintenance of the newly selected angle is assured while the vise jaws are retightened to again apply pressure to the workpiece. In the preferred embodiment of the present invention a set screw may be used to tighten the shaft and platform in a selected angular position so that the newly selected angle of the workpiece cannot be inadvertently changed while the vise jaws are tightened on the workpiece.

The unique jaw of the present invention is fully compatible with standard precision vise jaws so that it can be readily interchanged therewith. The invention is thus extremely convenient whenever a cut is being made at an angle relative to an edge of the workpiece or a plurality of different cuts are to be made at least one of which is at an angle with respect to the remaining cuts. Thus, the present invention is designed to provide a unique addition or ancillary device for use with existing devices to enable machinists to more conveniently and accurately vary the angle of the workpiece relative to the cutting tool in a machine such as a milling machine.

OBJECTS

It is therefore a principal object of the present invention to provide a vise jaw having a precision inclineable platform for varying the angular position of a workpiece relative to a machine cutting tool and which substantially reduces or entirely overcomes the aforementioned disadvantages of the prior art used for such angle variations.

It is an additional object of the present invention to provide an interchangeable jaw for a precision vise, which jaw includes a rotateable platform extending therefrom for varying the position of a workpiece held therein without requiring separate angle measuring devices for accurately positioning the workpiece.

It is still an additional object of the present invention to provide an interchangeable jaw for a precision device of the type primarily used in conjunction with cutting tools, such as milling machines and the like, and which provides a stable platform between the jaw of the invention and the opposing jaw for holding a workpiece at a selected precise angle relative to the cutting tool while the vise jaws are tightened against the workpiece.

It is still a further object of the present invention to provide a vise jaw having a precision inclineable platform for positioning a workpiece relative to a cutting tool at a precise angle relative to a reference angle and including built-in angle measurement means readily accessible to the machinist whereby no external angle measurement devices are required.

BRIEF DESCRIPTION OF THE DRAWINGS

The aforementioned advantages and objects of the present invention, as well as additional advantages and objects thereof, will be more fully understood hereinafter as a result of the detailed description of a preferred embodiment of the invention taken in conjunction with the accompanying drawings in which.

DETAILED DESCRIPTION OF A PREFERRED EMBODIMENT

Figure 1:
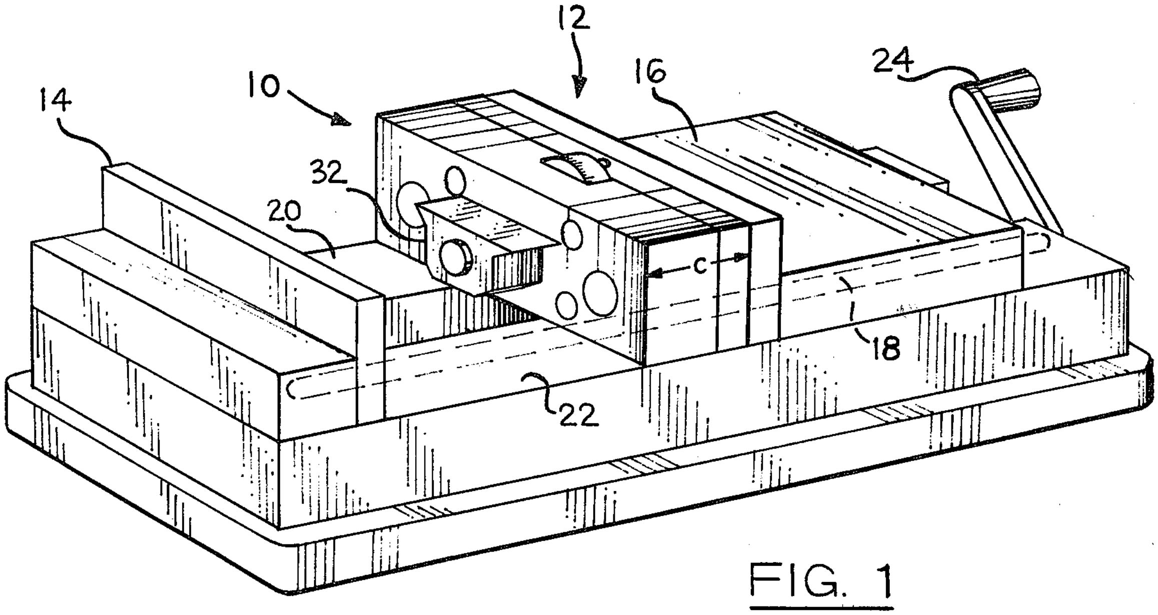
FIG. 1 is a three dimensional view of the present invention shown installed in a vise as one jaw thereof, with the platform of the invention inclined to receive a workpiece at a selected angular position.

Referring to FIG. 1 there is shown a three dimensional view of the present invention installed as one jaw 10 of a precision vise 12. In the embodiment illustrated, vise jaw 10 of the present invention constitutes the moveable jaw of vise 12. An opposing stationary jaw 14 is fixed whereby the two jaws may be used to apply opposing forces to a workpiece contained therebetween in a precise position for application of a high speed cutting tool and the like. Vise 12 also comprises a travel block 16 which is used to control the position of vise jaw 10 by means of an elongated threaded positioning member 18, a pair of planar vise ways 20 and 22 which support jaws 10 and 14 as well as travel block 16 in slideable engagement therewith, and a crank 24 which engages threaded member 18 for controlling the operation of moveable jaw 10 in a well-known manner.

In the view provided by FIG. 1 jaws 10 and 14 are separated to provide an unobstructed view of invention 10 including inclineable platform 30. Platform 30 constitutes one surface of rotateable shoe 32, the angular position of which is controlled by an indexed rotator 34, a portion of which extends above the top surface of jaw 10 for optimum access and visibility in controlling the angle of inclination of platform 30. It will be clear to those having skill in the art to which the present invention pertains that after platform 30 is adjusted to a selected angle by means of the precision angle indexing on the outer surface of rotator 34, shoe 32 is tightened into a fixed position by means of a set screw on the shaft therethrough as will be more fully understood hereinafter. Accordingly, platform 30 provides a stable support base at a selected angle for firmly holding a workpiece between jaws 10 and 14 for precise tooling or cutting at the selected angle of platform 30.

Figure 2:
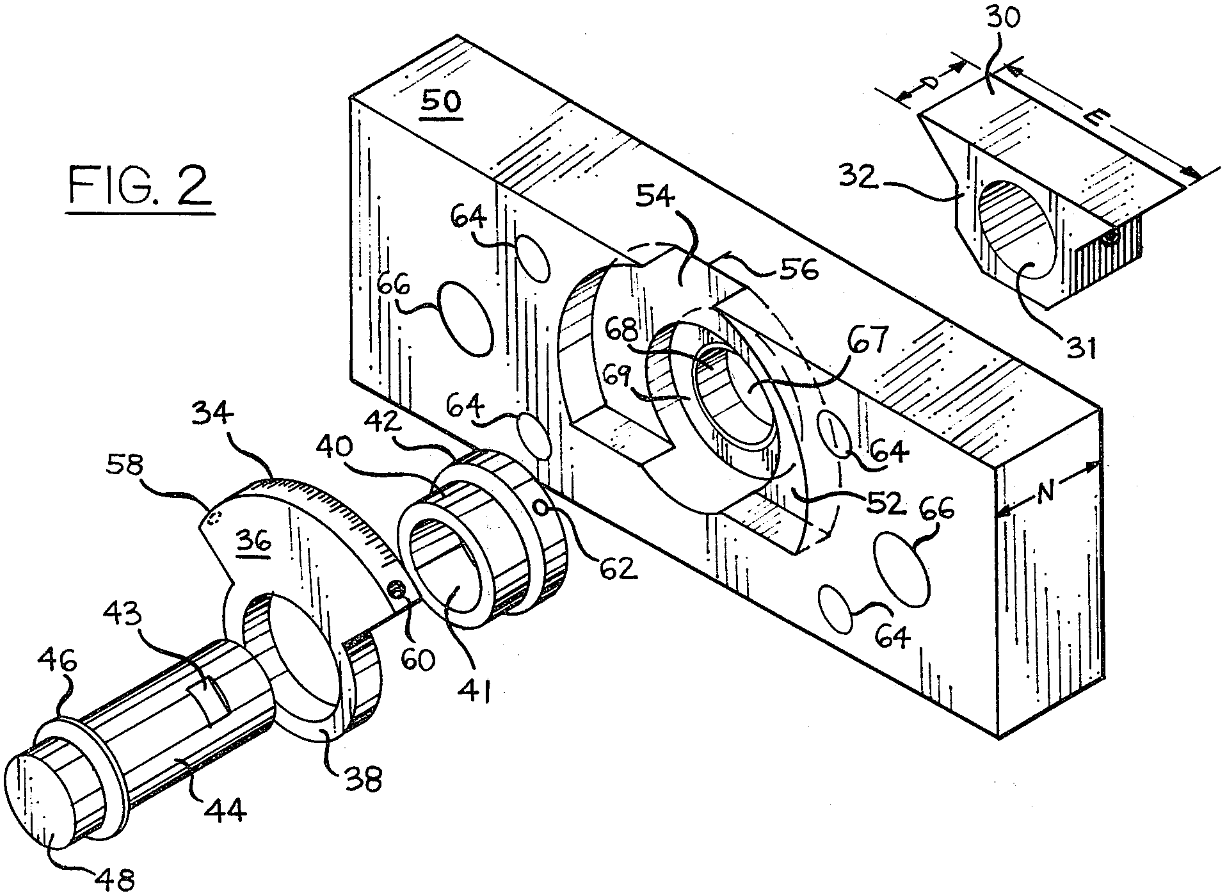
FIG. 2 is an isometric exploded view of the invention with the backplate omitted to provide an unobstructed view of the interior of the present invention.

The detailed structure of the vise jaw 10 of the present invention will now be described in conjunction with FIGS. 2–8 of which FIG. 2 provides an exploded view of the invention components illustrating the manner in which they are interconnected in the assembled jaw. FIG. 2 provides a view of five principal components of the jaw assembly, the sixth omitted element thereof being the backplate which will be described hereinafter in conjunction with FIG. 3. The five components illustrated in FIG. 2 include the platform shoe 32, the rotator 34, a collar 40, a shaft 44 and the housing frontplate 50.

Indexed rotator 34 comprises two portions, namely, segment portion 36 and ring portion 38. Ring portion 38 is adapted to receive a collar 40 and to fit firmly against shoulder 42 of collar 40. Collar 40 has an aperture 41 therethrough, which is adapted to receive shaft 44 which extends through the ring portion of rotator 34 through collar 40 and beyond the shoulder 42 of collar 40. Shaft 44 includes an integral flange 46 which is adapted to fit firmly against one side of rotator 34 opposite shoulder 42 whereby rotator 34 may be axially affixed on shaft 44 against flange 46. A shorter portion 48 of shaft 44 extends beyond flange 46 for seating within the backplate of the housing as described below in conjunction with FIG. 3. The portion of shaft 44 that extends beyond collar 40 includes a pair of grooves or slots 43, one of which is seen in FIG. 2. Slots 43 are each adapted to receive a set screw in shoe 32 after the shaft is inserted into and through an aperture 31 in shoe 32.

Housing frontplate 50 includes an inset 52 in the shape of the major portion of a circle. Inset 52 is designed to receive segment 36 of rotator 34 for circular movement therein about the axis of shaft 44. Inset 52 is positioned relative to the top surface of housing frontplate 50 to permit rotator 34 to extend just beyond the top surface through a rectangular window 54. It will be observed in FIG. 2 and hereinafter more fully explained in conjunction with FIG. 6, that the top surface of rotator 34 is indexed by means of reticle lines spaced at predetermined intervals such as 2° to provide a convenient means for determining the angle through which rotator 34, and thus shaft 44 and platform 30 are rotated with the invention fully assembled. For this purpose, an additional reticle reference line 56 is provided at the center of the top surface of housing frontplate 50 immediately adjacent window 54.

A circular passageway 67 extends through the housing frontplate 50 having a center point that coincides with the center point of the partial circle of inset 52 and a diameter suitable for receiving the protruding portion of shaft 44, preferably with a teflon bushing 68 therebetween. An additional inset 69 of annular shape around the perimeter of bushing 68 is adapted to receive shoulder 42 of collar 40. After shaft 44 is fully extended through the ring portion 38 of rotator 34 and aperture 41 of collar 40, set screws in partially threaded apertures 62, 58, and 60 are tightened down against the shaft to secure the collar and rotator respectively against the shaft to form a fully assembled unit. A portion of shaft 44 that extends through bushing 68 and beyond the housing frontplate 50 receives platform shoe 32.

Housing frontplate 50 includes six bolt holes including four smaller bolt holes 64 adapted to receive screws for securing the housing front and back plates together thereby sealing the assembly. A pair of larger bolt holes 66 receive larger bolts for securing the fully assembled jaw 10 of the present invention to travel block 16 shown in FIG. 1. It is by means of bolts installed in bolt holes 66 that the present invention may be readily connected to or removed from travel block 16 of vise 12, providing easy interchangeability with conventional vise jaws.

Figure 3:
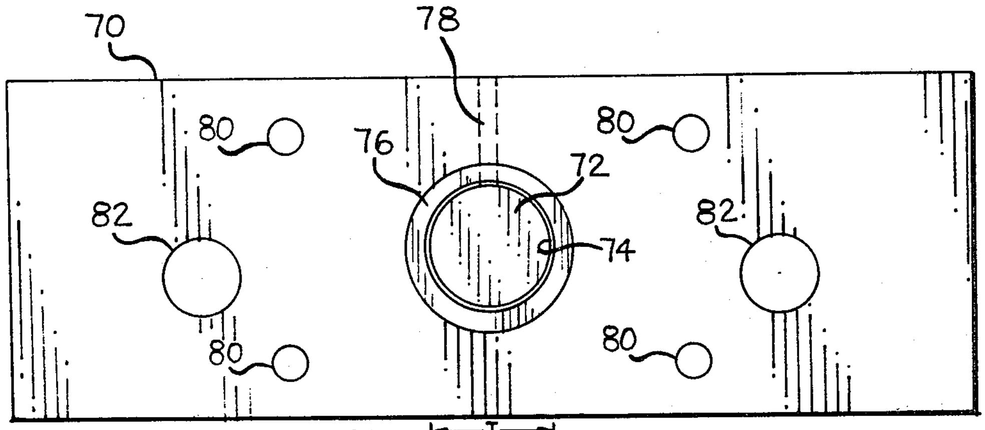
FIG. 3 is a plan view of the backplate of the housing of the invention.

The housing backplate 70 is shown in FIG. 3 and as indicated, includes a cylindrical well 72 having a teflon bushing 74 along the cylindrical wall thereof. Well 72 is adapted to receive the shorter portion 48 of shaft 44 as described previously in conjunction with FIG. 2. The rear surface of integral flange 46 is adapted to lie within a corresponding annular inset surface 76 adjacent well 72 along the perimeter thereof. A set screw aperture 78 extends from the top of backplate 70 to the inside surface of well 72 to provide a means for conveniently locking and unlocking shaft 44 in relation to the housing. Locking the shaft in relation to the housing permits the user to lock rotator 34 and platform 30 in a selected angular position which will not vary inadvertently as the jaw 10 is being adjusted toward fixed jaw 14 as shown in FIG. 1 with the workpiece therebetween supported on platform 30 at the selected angle.

Backplate 70 also includes a plurality of corresponding apertures or bolt holes adapted to match bolt holes 64 and 66 of frontplate 50. More specifically, bolt holes 80 are threaded to receive bolts that project through aperture 64 of housing frontplate 50 for securing the front and back plates to one another. On the other hand, apertures 82 of backplate 70 are unthreaded to provide a passageway for larger bolts that extend through the frontplate and backplate of the invention and into travel block 16 discussed previously in conjunction with FIG. 1.

Figure 4:
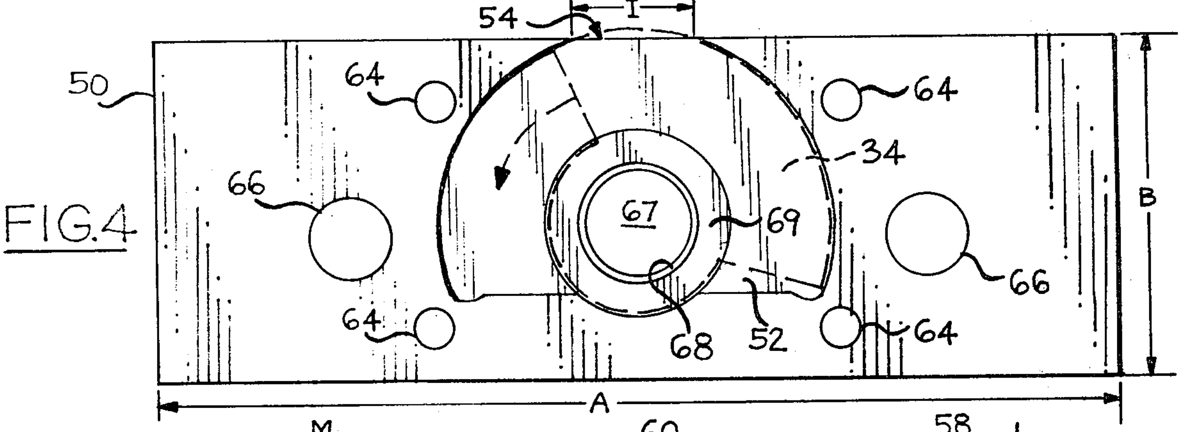
FIG. 4 is a plan view of the frontplate of the housing of the invention.

FIG. 4 illustrates the manner in which rotator 34 is positioned within inset 52 of housing frontplate 50 and is adapted to rotate therein over a limited arc about the coincident axes of ring 38 and circular aperture 67 of frontplate 50. Rotator 34 is designed to provide at least 90° of inclination of platform 30 in either direction, clockwise or counterclockwise, depending upon the selected relative positions of rotator 34 and platform shoe 32 on shaft 44 when all the set screws that secure rotator 34 and platform shoe 32 onto shaft 44 are tightened.

Figure 5:
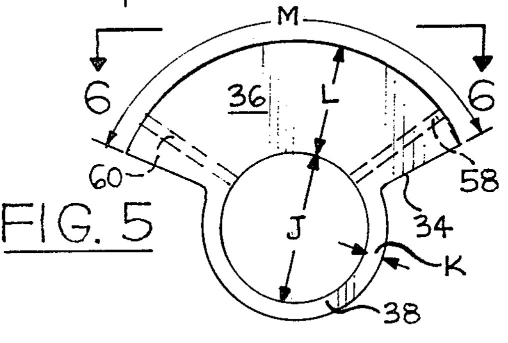
FIG. 5 is a plan view of the angle rotator of the invention.
Figure 6:
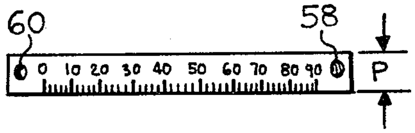
FIG. 6 is a top view of the angle rotator taken along lines 6—6 of FIG. 5.

The positions of the set screw apertures 58 and 60 of rotator 34 are best seen in FIG. 5. As shown therein, set screw apertures 58 and 60 extend from the outer perimeter of the circular segment portion 36 of rotator 34 through to the inner surface of the ring portion 38 of the rotator where the set screws may be tightened down onto the outside surface of collar 40. Set screw apertures 58 and 60 are also shown in dotted line in the top view of FIG. 6 which also provides a view of the angle reticle lines along the top surface of the rotator along the portion thereof that extends through window 54 at the top of housing frontplate 50 as seen in FIG. 4.

Figure 7:
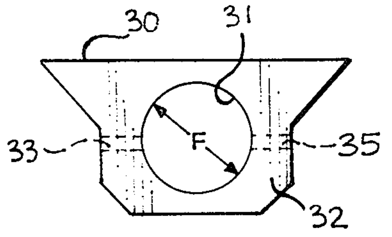
FIG. 7 is a plan view of the platform shoe of the invention.

The set screw apertures that provide means for securing platform shoe 32 to shaft 44 are seen best in FIG. 7 which also provides an edge view of platform 30 as well as an axial view of shoe aperture 31 which is adapted to receive the portion of shaft 44 that extends beyond the face of housing frontplate 50. As previously indicated, shaft 44 provides grooved flat portions 43 which comprise flat surfaces against which set screws through set screw apertures 33 and 35 of shoe 32 are adapted to bear for securing shoe 32 to shaft 44.

Figure 8:
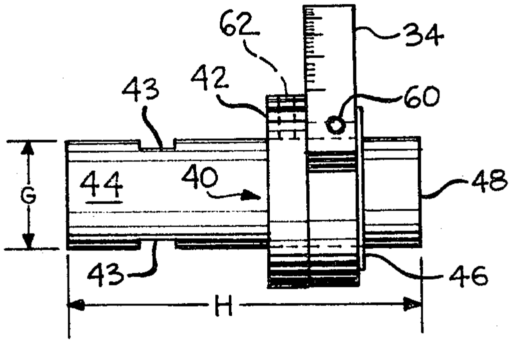
FIG. 8 is a side view of the shaft, angle rotator and collar which, in combination, provide the angular adjustment means of the invention.

Grooved surfaces 43 are seen in cross section in FIG. 8 which provides a side view of the assembly comprising shaft 44, rotator 34, and collar 40 in assembled configuration. As shown in FIG. 8, when these three components of the invention are assembled, rotator 34 bears against integral flange 46 on one side and against the shoulder portion 42 of collar 40 on the other side. Thus rotator 34 is affixed both radially and axially to shaft 44 when set screws in aperture 62 of collar shoulder 42 and in apertures 58 and 60 of rotator 34 are installed and tightened down against the shaft. A shorter portion 48 of shaft 44 extends beyond the integral flange 46 for bearing against teflon bushing 74 within well 72 of housing backplate 70 as discussed previously in conjunction with FIG. 3.

In the preferred embodiment illustrated herein all of the components of the invention are constructed of cold-rolled, hardened and finished steel with the exception of the teflon bushings. It is also preferable to use teflon washers between all contacting moveable surfaces such as between shoulder 42 of collar 40 and the surface of annular inset 69 of housing frontplate 50.

The following table provides a summary description of various dimensions of a preferred embodiment of the invention adapted for use with a particular vise.

TABLE I

| SELECTED GEOMETRICAL PARAMETERS (DIMENSION) | |
|---|---|
| A | 6.400 ± .005 inches |
| B | 2.250 ± .001 inches |
| C | 1.400 ± .001 inches |
| D | 0.950 ± .001 inches |
| E | 2.000 ± .001 inches |
| F | 0.750 ± .001 inches |
| G | 0.748 ± .001 inches |
| H | 2.300 ± .001 inches |
| I | 0.765 ± .001 inches |
| J | 1.001 ± .001 inches |
| K | 0.125 ± .001 inches |
| L | 0.750 ± .001 inches |
| M | 127 ± .1 degrees |
| N | 0.943 ± .001 inches |
| P | 0.375 ± .001 inches |

It will now be understood that what has been disclosed herein is a unique jaw assembly for a precision vise that is readily interchangeable with the conventional jaws of such a vise. The present invention provides a rotateable platform supported by a shaft extending from the face of the jaw and adapted to provide an inclineable support surface for a workpiece at any angle selected by an index rotator forming part of the jaw assembly and partially extending above the top surface of the jaw through a window providing convenient means for selecting a precise angle of inclination of the workpiece held between the vise jaws.

Although a particular, preferred embodiment of the invention has been disclosed herein, in view of applicant's teachings it will now be apparent to those having skill in the art to which the present invention pertains that various modifications may be made to the structure, dimensions, and materials of the present invention without departing from the contemplated scope thereof which is to be limited only by the claims appended hereto.

I claim:

1. An improved vise jaw apparatus for use in a vise of the type having two opposed jaws for securing a workpiece between the respective faces thereof, the improvement comprising:

a shoe having at least one planar surface forming a platform that is perpendicular to the face of said jaw apparatus and that is adapted for supporting said workpiece in proximity to said apparatus face, a rotator substantially contained within said jaw apparatus and having a portion accessible at the exterior of said jaw apparatus for rotation of said rotator through a selected arc, means interconnecting said rotator and said shoe for inclining said platform through an angle corresponding to said selected arc, and a housing having a frontplate and a backplate, said frontplate having an inset portion for receiving said rotator and a window through which said rotator accessible portion extends, said backplate having means for connection to said frontplate for enclosing said inset portion whereby said rotator is substantially enclosed.

2. The improvement recited in claim 1 further comprising an aperture in said frontplate and wherein said interconnecting means comprises a shaft extending through said frontplate aperture and which is connected to said shoe and to said rotator.

3. The improvement recited in claim 2 wherein said backplate further comprises a well aligned with said shaft and of cross-sectional dimensions substantially equal to said shaft for receiving said shaft in rotational engagement therewith.

4. The improvement recited in claim 1 further comprising an aperture in said apparatus face and wherein said interconnecting means comprises a shaft extending through said aperture and which is connected to said shoe and to said rotator.

5. The improvement recited in claim 4 wherein said rotator comprises a circular segment portion and a ring portion integral thereto, the segment portion having indexed reticle lines along the circumferential perimeter thereof for gauging said arc, the ring portion having an aperture therethrough for receiving said shaft.

6. The improvement recited in claim 4 wherein said shoe has an aperture at least partially therethrough for receiving said shaft.

* * * * *